United States Patent
Bentley et al.

(10) Patent No.: US 9,852,166 B2
(45) Date of Patent: *Dec. 26, 2017

(54) TASK HANDLING IN A MULTISYSTEM ENVIRONMENT

(71) Applicant: International Business Machines Corporation, Armonk, NY (US)

(72) Inventors: Alexander T. Bentley, Austin, TX (US); Jonathan Limburn, Southampton (GB); Albert Maier, Tuebingen (DE); Scott Schumacher, Porter Ranch, CA (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/334,320

(22) Filed: Oct. 26, 2016

(65) Prior Publication Data

US 2017/0075725 A1    Mar. 16, 2017

Related U.S. Application Data

(63) Continuation of application No. 14/849,688, filed on Sep. 10, 2015.

(51) Int. Cl.
    *G06F 9/50* (2006.01)
    *G06N 5/02* (2006.01)
    *G06F 17/30* (2006.01)

(52) U.S. Cl.
    CPC .............. *G06F 17/30303* (2013.01)

(58) Field of Classification Search
    None
    See application file for complete search history.

(56) References Cited

U.S. PATENT DOCUMENTS

| | | |
|---|---|---|
| 8,200,527 B1 | 6/2012 | Thompson et al. |
| 8,412,735 B2 | 4/2013 | Yeh et al. |
| 8,601,029 B2 | 12/2013 | Anand et al. |
| 8,661,065 B2 | 2/2014 | Rausch et al. |
| 8,700,577 B2 | 4/2014 | Yeh et al. |
| 2003/0028409 A1* | 2/2003 | Flores ............ G06Q 10/10 717/135 |

(Continued)

OTHER PUBLICATIONS

Nassreddine et al., "Cognitive governance, cognitive mapping and cognitive conflicts: Structural analysis with the MICMAC method", Nassreddine & Anis, Cogent Economics & Finance (2014), pp. 1-13. http://dx.doi.org/10.1080/23322039.2014.922893.

Otto B., "How to design the master data architecture: Findings from a case study at Bosch", International Journal of Information Management, vol. 32, Issue 4, Aug. 2012, pp. 337-346. © 2011 Elsevier Ltd. DOI:10.1016/j.ijinfomgt.Nov. 18, 2011.

(Continued)

*Primary Examiner* — Umut Onat
(74) *Attorney, Agent, or Firm* — Laura E. Gisler

(57) ABSTRACT

Task patterns may exist in completed tasks within a task handling system. A task pattern may comprise task data and metadata and an action that the task handling system uses to complete the task. A task pattern may be identified and compared with task patterns in a database. If the identified task pattern matches a task in the database, a task pattern count for the task in the database can be incremented. If this incrementing results in the task pattern count exceeding a threshold, then the system can search for and identify other active tasks that match the task pattern. The appropriate action for the task pattern can be applied to each of the matched active tasks and each of the active tasks can then be closed.

7 Claims, 14 Drawing Sheets

(56) References Cited

U.S. PATENT DOCUMENTS

| | | |
|---|---|---|
| 2011/0126206 A1* | 5/2011 | Kato ................ G06F 1/206 |
| | | 718/103 |
| 2012/0017262 A1 | 1/2012 | Kapoor et al. |
| 2012/0215733 A1 | 8/2012 | Breiter et al. |
| 2013/0067182 A1* | 3/2013 | Westbrooke ...... G06F 17/30312 |
| | | 711/162 |
| 2014/0052695 A1 | 2/2014 | Cohen et al. |
| 2014/0279947 A1 | 9/2014 | Chachra et al. |
| 2014/0379417 A1 | 12/2014 | Gujjewar et al. |
| 2015/0006491 A1 | 1/2015 | He et al. |
| 2015/0058280 A1 | 2/2015 | Nelke et al. |
| 2015/0193511 A1 | 7/2015 | Woody et al. |

OTHER PUBLICATIONS

Woodall et al., "A Classification of Data Quality Assessment and Improvement Methods", DSpace @ Cambridge, 2014, 3 pages. Last printed Mar. 21, 2016. https://www.repository.cam.ac.uk/handle/1810/24720.

Leonard et al., "Data Correction with Data Quality Services", Springer Link, SQL Server Integration Services Design Patterns, Dec. 19, 2014, Chapter 5, pp. 101-123. http://www.link.springer.com/chapter/10.1007%2F978-1-4842-0082-7_5.

Dow et al., "Task Handling in a Master Data Management System", U.S. Appl. No. 15/075,236, filed Mar. 21, 2016.

Bentley et al., "Task Handling in a Multisystem Environment", U.S. Appl. No. 14/849,688, filed Sep. 10, 2015.

List of IBM Patents or Patent Applications Treated as Related, dated Oct. 25, 2016, pp. 1-2.

* cited by examiner

| | Count | Auto |
|---|---|---|
| Pattern1 | 17 | Yes |
| Pattern2 | 4 | No |
| Pattern3 | 1 | No |

FIG. 7B

TASK HANDLING IN A MULTISYSTEM ENVIRONMENT

BACKGROUND

The present disclosure relates to task handling and data management, and more specifically, to organizing data across different formats.

An organization, for example a commercial company, may generate large amounts of data during normal functioning of the organization. Maintaining the quality and accuracy of this data may be important. A particular focus may be data which is essential for the functioning of the organization. In a company this may include, for example, data about customers, suppliers, partners, products, materials, accounts, and employees and their records. Such data is termed master data and may be high value, core information which is needed across different business processes, across organizational units, and between operational systems and decision support systems of the company. In some organizations, the multiplicity of systems being used may result in data records in a multiple, different formats and structures.

SUMMARY

Embodiments of the present disclosure may be directed toward a computer-implemented method where a task pattern is identified in a completed task. The completed task may be in a task handling system. The identified task pattern may comprise a first data set, the first data set selected from a group consisting of task data and task metadata and an action taken in the task handling system to complete the completed task. The identified task pattern can then be compared with task patters of a patterns database and the system can determine the identified task pattern matches an existing task pattern in the patterns database. The patterns database may have a plurality of task patterns and actions associated with each task pattern. In response to the determining, the task pattern count of the existing task pattern can be incremented, and it may be determined that a task pattern count threshold for the existing task pattern in the patterns database has been exceeded. Active tasks in an active task list can then be searched and active tasks that match the existing task pattern can be identified. To each of these identified matched active tasks, the action for the existing task pattern can be applied. Each of the matched active tasks can then be closed.

Embodiments of the present disclosure may be directed toward a system with one or more processing circuits, where the circuits may be configured to identify a task pattern in a completed task. The completed task may be in a task handling system. The identified task pattern may comprise a first data set, the first data set selected from a group consisting of task data and task metadata and an action taken in the task handling system to complete the completed task. The identified task pattern can then be compared with task patterns of a patterns database and the system can determine the identified task pattern matches an existing task pattern in the patterns database. The patterns database may have a plurality of task patterns and actions associated with each task pattern. In response to the determining, the task pattern count of the existing task pattern can be incremented, and it may be determined that a task pattern count threshold for the existing task pattern in the patterns database has been exceeded. Active tasks in an active task list can then be searched and active tasks that match the existing task pattern can be identified. To each of these identified matched active tasks, the action for the existing task pattern can be applied. Each of the matched active tasks can then be closed.

Embodiments of the present disclosure may be directed toward a computer program product with a computer readable storage medium having program instructions embodied therewith. The computer readable storage medium is not a transitory signal per se. The program instructions may be executable by a computer processing circuit to cause the circuit to perform a method where a task pattern is identified in a completed task. The completed task may be in a task handling system. The identified task pattern may comprise a first data set, the first data set selected from a group consisting of task data and task metadata and an action taken in the task handling system to complete the completed task. The identified task pattern can then be compared with task patters of a patterns database and the system can determine the identified task pattern matches an existing task pattern in the patterns database. The patterns database may have a plurality of task patterns and actions associated with each task pattern. In response to the determining, the task pattern count of the existing task pattern can be incremented, and it may be determined that a task pattern count threshold for the existing task pattern in the patterns database has been exceeded. Active tasks in an active task list can then be searched and active tasks that match the existing task pattern can be identified. To each of these identified matched active tasks, the action for the existing task pattern can be applied. Each of the matched active tasks can then be closed.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

FIG. 7B depicts a data structure for recording pattern count values, according to embodiments.

Figure 1:
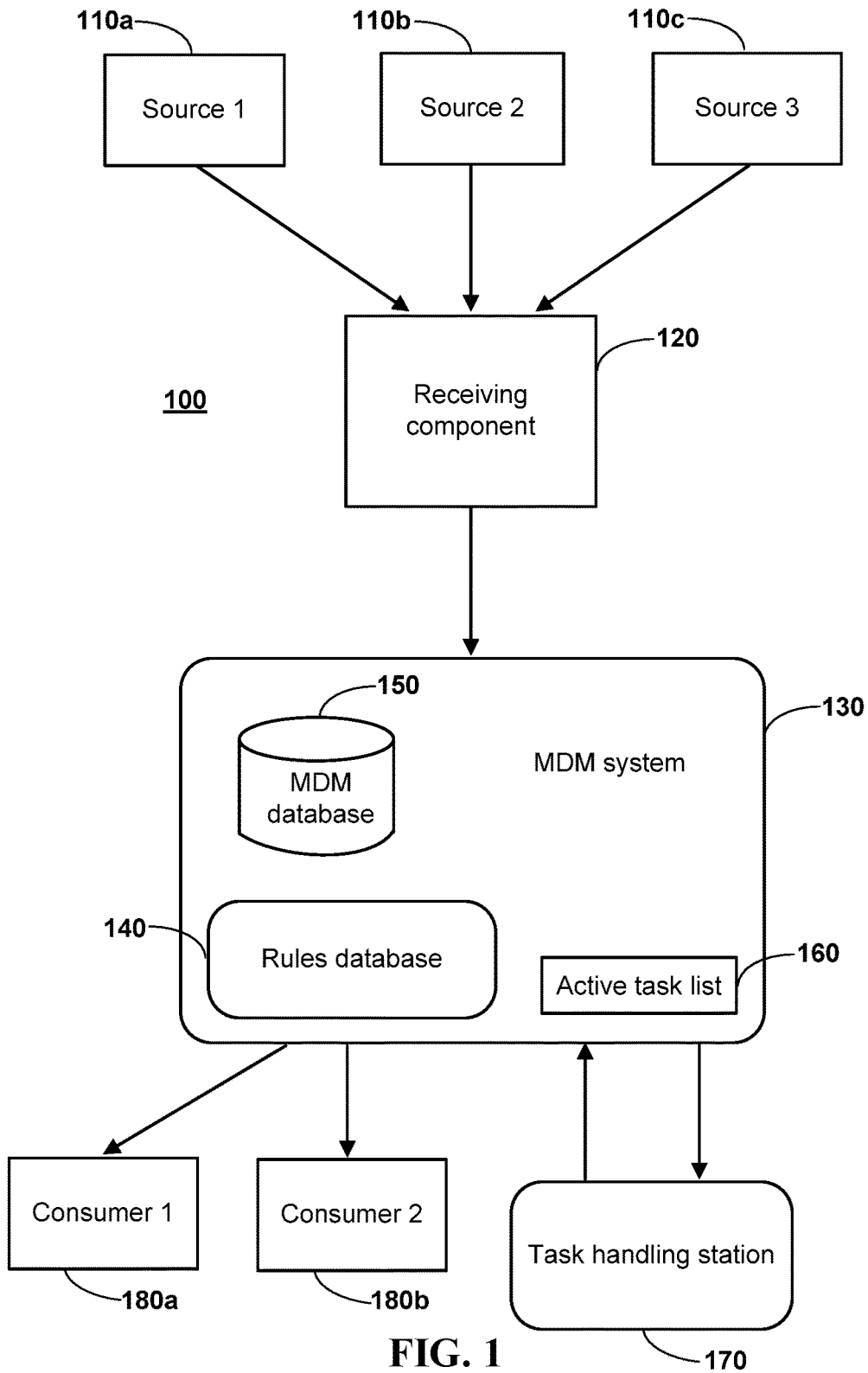
FIG. 1 depicts a block diagram of a master data management (MDM) system, according to embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to task handling, more particular aspects relate to data management in a multisystem environment. While the present disclosure is not necessarily limited to such applications, various aspects of the disclosure may be appreciated through a discussion of various examples using this context.

Many organizations may generate large amounts of data that needs to be saved and accessed throughout the course of business. This data may be created and saved in a variety of formats, based on, for example, a client's needs or a branch of the organization's structure or function. However, this data, despite the diversity of formats or systems to which it belongs, may need to be accessed and utilized across functional units. To attempt to reconcile such differences and to allow coherent and consistent handling of an organization's master data, the concept of master data management, MDM, has developed. An MDM system may be a computing product comprising a set of data governance processes, tools, policies, and rules which provide this coherent and consistent data handling inherent in master data management.

A feature of an MDM system may be the application of rules and policies to data records to attempt to unify the organization's view of its master data. This may involve maintaining a central authoritative repository of the organization's master data. The rules and policies may be manually defined, for example, by a data governance council of individuals who understand the organization's master data requirements. This may be, in particular, through an understanding of the usage of the data, of the source of the data and its structure, of industry specific compliance and regulation requirements, and of corporate best practices for data, amongst other things.

In some MDM systems, the processing of data can generate tasks which comprise identifying actions which need to be applied to data to correct, for example, inaccuracies, inconsistencies, and duplications. Tasks may be handled by the MDM system applying rules to the data and updating the data as required by the rules. Some tasks may not match specific rules exactly but are, for example, partial matches. These tasks, where there is not an exact match to a rule, may be decided by an operator, termed a data steward.

The data steward may be, for example, an individual who has been authorized by the data governance council of the organization, and whose role is to supervise the quality of the organization's master data. The data steward may apply individual judgment and understanding of rules and policies to partially matched data, and the data steward can decide on an appropriate action to apply to the data.

In some organizations, a significant number of tasks requiring manual intervention may be created on a daily basis (e.g., as changes are made to the master data). Embodiments of the disclosed may be described with reference to a task handling system for handling tasks which arise in relation to a master data management (MDM) system. Embodiments of the disclosed may include applications in other task handling systems, where the task handling systems are concerned with the maintenance of the quality of the data used by an organization.

FIG. 1 depicts a block diagram of an organizational data processing structure 100, according to embodiments. The elements of organizational data processing system 100 may comprise an MDM system 130. There may be a number of possible structures for organizing an MDM system. For example, a database of master data may be maintained as a separate entity in an MDM system, an MDM system may provide a view in to a collection of source system databases, or the system may be a hybrid comprising some combination of the two. FIG. 1 will be described with reference to a system in which a separate database of master data is maintained by the MDM system.

FIG. 1 depicts an organizational data processing structure 100 comprising three example organization source systems. An organizational data processing structure could comprise more or fewer organizational source systems, and the description provided is for example only. Source systems 1, 2 and 3, 110a, 110b, and 110c, respectively, may represent different areas of an organization's functioning. For example, source system 1, 110a, could be a sales system, source system 2, 110b, could be a customer database system, and source system 3, 110c, could represent a payroll system. Source systems 1, 2, and 3 may continually generate new data. For example, source system 1, 110a, may be a sales system which generates data relating to a sale. In addition to handling this data within source system 1, 110a, the system may pass data relating to the sale to receiving component 120 for analysis and preparation for handling by the MDM system.

Receiving component 120 may receive data from each source system, 110a, 100b, and 110c, and perform an analysis to identify data which may be relevant to the organization's master data collection. Receiving component 120 may comprise, for example, an application program, a constituent component of a larger data processing system, or a component of MDM system 130. Receiving component 120 may carry out further processing, for example, to map the received data to a format compatible with the data format of MDM system 130. Receiving component 120 may pass processed data to MDM system 130.

MDM system 130 may comprise a rules database 140. Rules database 140 may comprise a collection of policies and rules which have been determined to be appropriate for application to the organization's master data. Such policies and rules describe the types of data to be recorded as master data, the form of that data, and the actions to be performed upon it. The policies and rules may be set according to a data governance strategy laid down by a data governance council of individuals who understand the organization's master data requirements.

MDM system 130 may further comprise MDM database 150, a database which contains master data for the organization. MDM system 130 may compare received data with master data in MDM database 150 of MDM system 130, and apply appropriate rules from rules database 140. With the application of appropriate rules from rules database 140, MDM system 130 identifies a task relevant to the received data. The task may comprise, for example, an item of data and an action which could be applied to it. The task could also comprise multiple items of data and one or more actions which could be applied to them. With the application of further rules from rules database 140, MDM system 130 may determine whether the identified task matches a rule to a sufficient degree to be automatically processed by MDM system 130.

For example, the data may comprise a name and address, and the task may comprise identifying a duplicate name and address record in the master data. A rule may specify the criteria of similarity which determine a match. For example, small differences in certain fields may be allowed while still identifying the two records as relating to the same entity and thus a match. Where the similarity criteria are met, the MDM system can automatically confirm the match and associate the new data in the system with the master data record of MDM database 150, for example, by updating an address record.

Where an identified task does not satisfy the criteria of an appropriate rule in full but does provide a partial match, MDM system 130 may be configured to not process the task automatically. Thus, this partial match may require a further action. For example, an address may match parts of an address in a master data record, but the address may not sufficiently match the address in the master data record to satisfy the criteria of an address matching rule for automatically collapsing the two in to one (e.g., identifying the two as the same address), and so the addresses may then be categorized as suspected duplicates. The further action that may be taken comprises, for example, passing the identified task to a task handling station 170.

The task handling station may be a workstation for a human operator, for example a data steward, as discussed herein. The data steward may be an individual who has been authorized by the data governance council of the organization, whose role is to supervise the quality of the organization's master data. Although illustrated as a single task handling station 170, any number of task handling stations 170 and data stewards may be provided as appropriate for the volume of tasks.

Task handling functionality of MDM system 130 may send tasks as they are generated by MDM system 130 to an active task list comprising queue 160 for action by task handling station 170 of a data steward. Although illustrated as a single task list and queue, active task list 160 may comprise any number of individual queues. For example, there may be one queue per task handling station 170. A data steward at task handling station 170 may determine an appropriate action for each queued task when the task is taken from the top of the active task list comprising queue 160, based on the data steward's understanding of the policies and rules of the data governance council. In the example above of addresses identified as potential duplicates, the determination may be whether the suspected duplicates do, in fact, represent the same address. Task handling station 170 may pass the action for the particular task decided on by the data steward to MDM system 130 which applies it to the appropriate master data in MDM database 150.

Also illustrated in FIG. 1 are representative master data consuming systems of the organization, shown as consumer 1, 180*a*, and consumer 2, 180*b*, which are systems of the organization which may require access to the records of the organization's master data. Any number of consuming systems may receive master data from MDM database 150 of MDM system 130, and each of consuming systems consumer 1, 180*a*, and consumer 2, 180*b*, may comprise the same system as one of source systems source 1, 2, or 3 (110*a*, 110*b*, and 110*c*, respectively).

Figure 2:
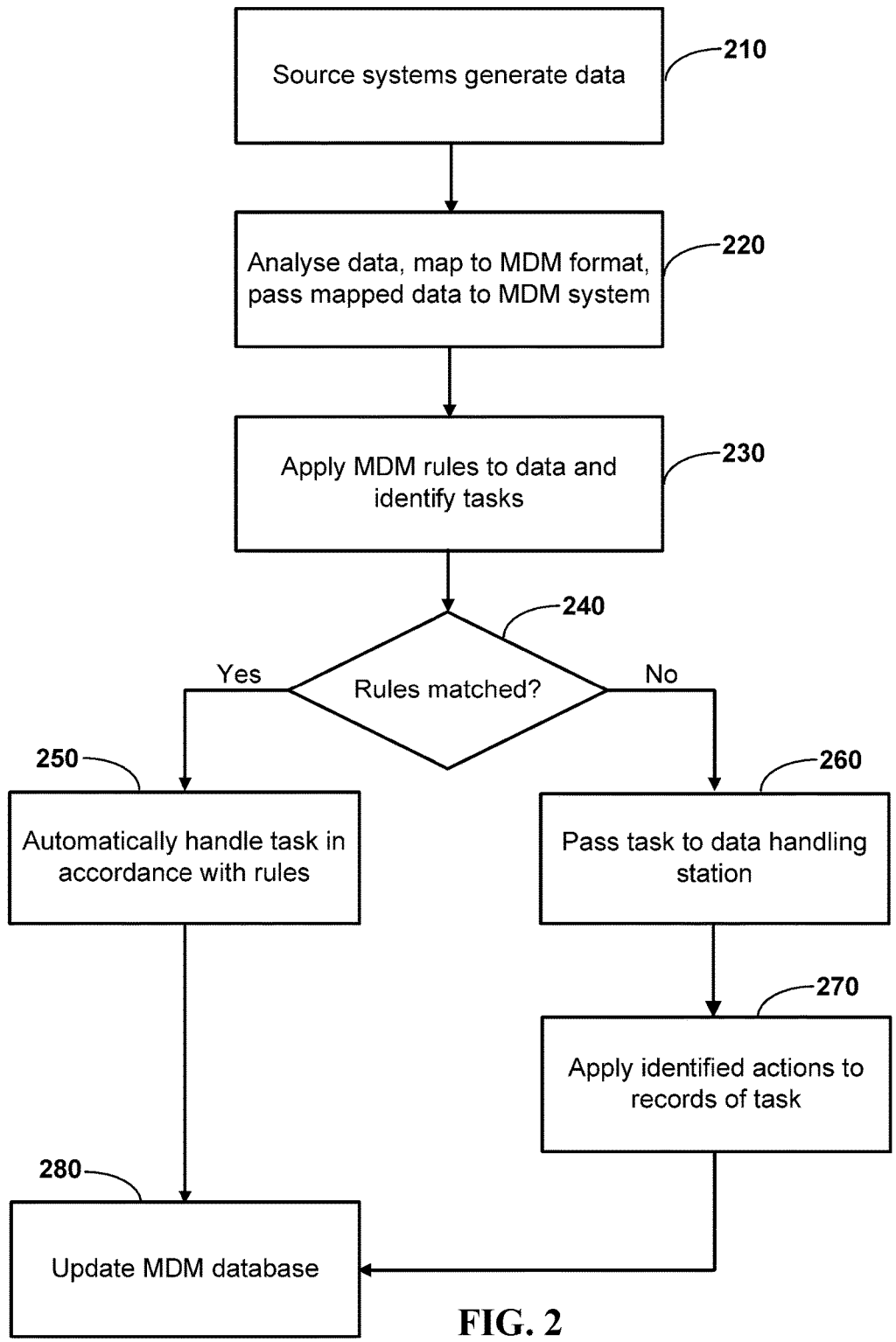
FIG. 2 depicts a flow chart illustrating the operation of an MDM system, according to embodiments.

FIG. 2 illustrates a flow diagram for the operation of a data processing structure (e.g., data processing structure 100 of FIG. 1) comprising an MDM system. At step 210, source systems, such as source systems 110*a* to 110*c*, generate data. At step 220, receiving component 120 analyses the generated data to identify data relevant to the organization's master data, and may map it to a MDM format to enable handling by MDM system 130. At step 230, MDM system 130 applies applicable MDM rules of rules database 140 to the received data to identify a task appropriate to the data.

At step 240, based on further rules, MDM system 130 may make a determination as to whether or not the matching criteria of an identified rule are met so that MDM system 130 may automatically handle the task. If the answer is "yes" (i.e. a match), then at step 250 MDM system 130 can automatically handle the task. Processing may pass to step 280, where MDM system 130 can update the master data of MDM database 150 as determined by the applicable rules and the data.

If there is a partial match to an applicable rule, so that the rule is appropriate but the task is not matched to the level of the matching criteria of the rule, then the answer at 240 is "no" and at step 260 MDM system 130 can pass the task to the active task list comprising queue 160 of task handling station 170 and to a data steward for action. A data steward at task handling station 170 can then determine an action or actions for the task at step 270, and MDM system 130 can update the master data of MDM database 150 as appropriate at step 280.

MDM system 130 may identify features of data which give rise to a large number of recurring tasks which only partially meet the matching criteria of a rule of rules database 140 of MDM system 130. This may occur, for example, where a new format of a particular type of data record arises, or where a default value occurs in a data field so that a large number of data records have the same value in that data field. This may result in a partial match to an established rule so that matching criteria for automatic processing by MDM system 130 are not met. This may affect a large number of data records, so that there may be a large number of very similar tasks in the queue for the attention of a data steward at task handling station 170. Data steward at task handling station 170 may then issue a large number of identical or very similar actions to MDM system 130. The extra work involved for data steward at task handling station 170 and subsequent extra data processing may lead to a delay in processing of tasks which could delay the updating of master data. Master data may not be up-to-date as a result and the quality of the organization's master data could suffer accordingly.

Figure 3A:
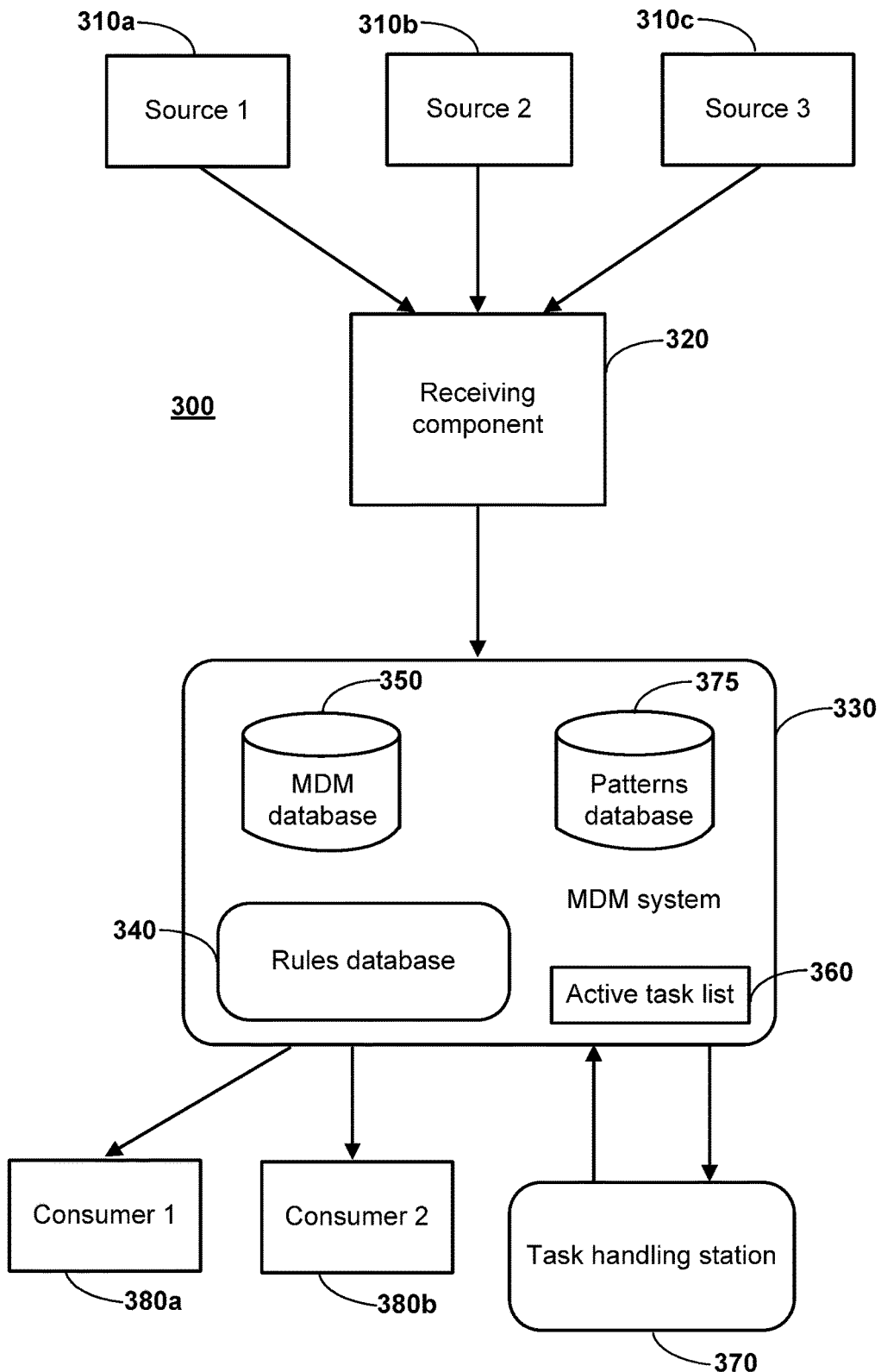
FIG. 3A depicts a block diagram of an MDM system for handling data, according to embodiments.

FIG. 3A depicts an organizational data processing system 300 comprising an MDM system 330 according to embodiments. The organizational data processing system may parallel the data processing structure 100 in FIG. 1. Source systems 1, 2 and 3, 310*a*, 310*b*, and 310*c*, respectively, are comparable to source systems 110*a* to 110*c*, and source systems 1-3 310 may continually generate new data. FIG. 3A illustrates representative consumers of master data, consumer 1, 380*a* and consumer 2, 380*b*, and as before they may be the same systems as source systems 1, 2, or 3, 310*a* to 310*c*.

In embodiments, receiving component 320 can have comparable functionality to receiving component 120. Receiving component 320 may pass processed data to MDM system 330. MDM system 330 may comprise rules database 340. Rules database 340 may comprise a collection of policies and rules as described with reference to rules database 140 (of FIG. 1). MDM system 330 may further comprise MDM database 350 of master data, which may have comparable functionality to MDM database 150 above.

MDM system 330 can compare received data with master data in MDM database 350 of MDM system 330, apply appropriate rules of rules database 340, and identify a task which may not be processed automatically, for example as described with reference to MDM system 130 (FIG. 1).

If the task is not processed automatically, the system may provide further action to processes the task. For example, the further action may comprise passing the identified task to an active task list comprising queue 360 for action at task handling station 370 by a data steward. Although illustrated as a single task list, active task list 360 may comprise any number of individual queues over which the task list is distributed. For example, there may be one queue per task handling station 370 for each data steward. Task handling station 370 may comprise a single task handling station, or any number of separate task handling stations 370.

As described with reference to MDM system 130, a data steward at task handling station 370 may determine an appropriate action for each queued task, and task handling station 370 can pass the determined action for the task to MDM system 330. The MDM system 330 can then apply the action for that task to the appropriate master data in MDM database 350, as described herein.

In embodiments, MDM system 330 may further comprises patterns database 375 and associated pattern identification logic. For each task completed by a data steward at task handling station 370, pattern identification logic of MDM system 330 can identify a pattern of the completed task. The pattern is a data record which may represent the characteristics of the task and the action taken by the data steward at task handling station 370. Pattern identification logic of MDM system 330 may record the pattern in a defined pattern format in patterns database 375.

Figure 3B:
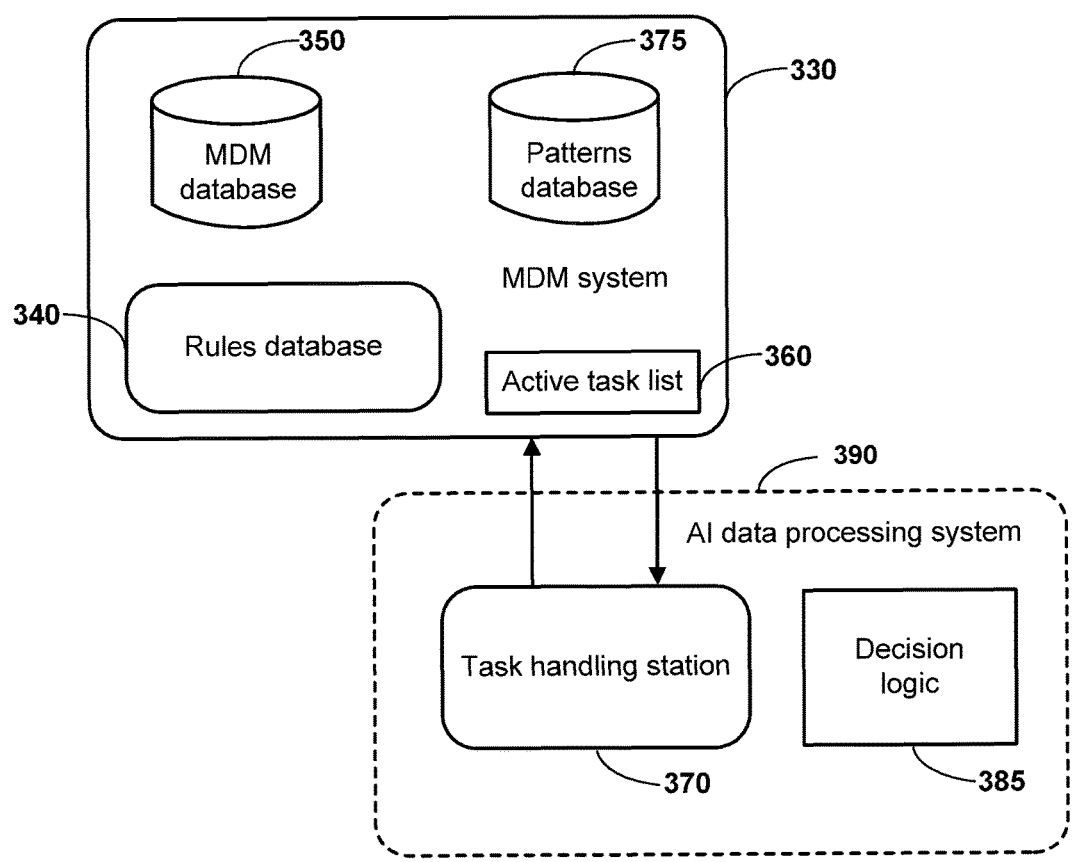
FIG. 3B depicts a portion of the MDM system of FIG. 3A, according to embodiments.

FIG. 3B depicts part of an organizational data processing system comprising MDM system 330 according to embodiments. The unillustrated remainder of the system may be as illustrated in FIG. 3A, and the constituent parts can function as described with reference to that figure. Task handling station 370 can form part of an artificial intelligence data processing system, or AI system, 390. AI system 390 may comprise decision logic 385 to support decision making of a data steward, or in some embodiments to replace the data steward. AI system 390 may comprise data gathering functionality, a database, fuzzy logic processing, or other artificial intelligence constructs to augment or replace human decision making at the data steward position.

If AI system 390 replaces human decision making in the manner described, the action taken to complete a task in active task list 360 may be determined by decision logic 385 and actioned automatically. The identified task pattern of the completed task is written to patterns database 375 as described with reference to FIG. 3A above. In embodiments, task handling station 370 may comprise a component part of AI system 390, or of MDM system 330, and not comprise a physically separate location. In other embodiments AI system 390 may comprise an integrated part of MDM system 330 so as to form a part of data processing functionality of MDM system 330. Other arrangements are possible without departing from the scope of the disclosed.

Figure 4:
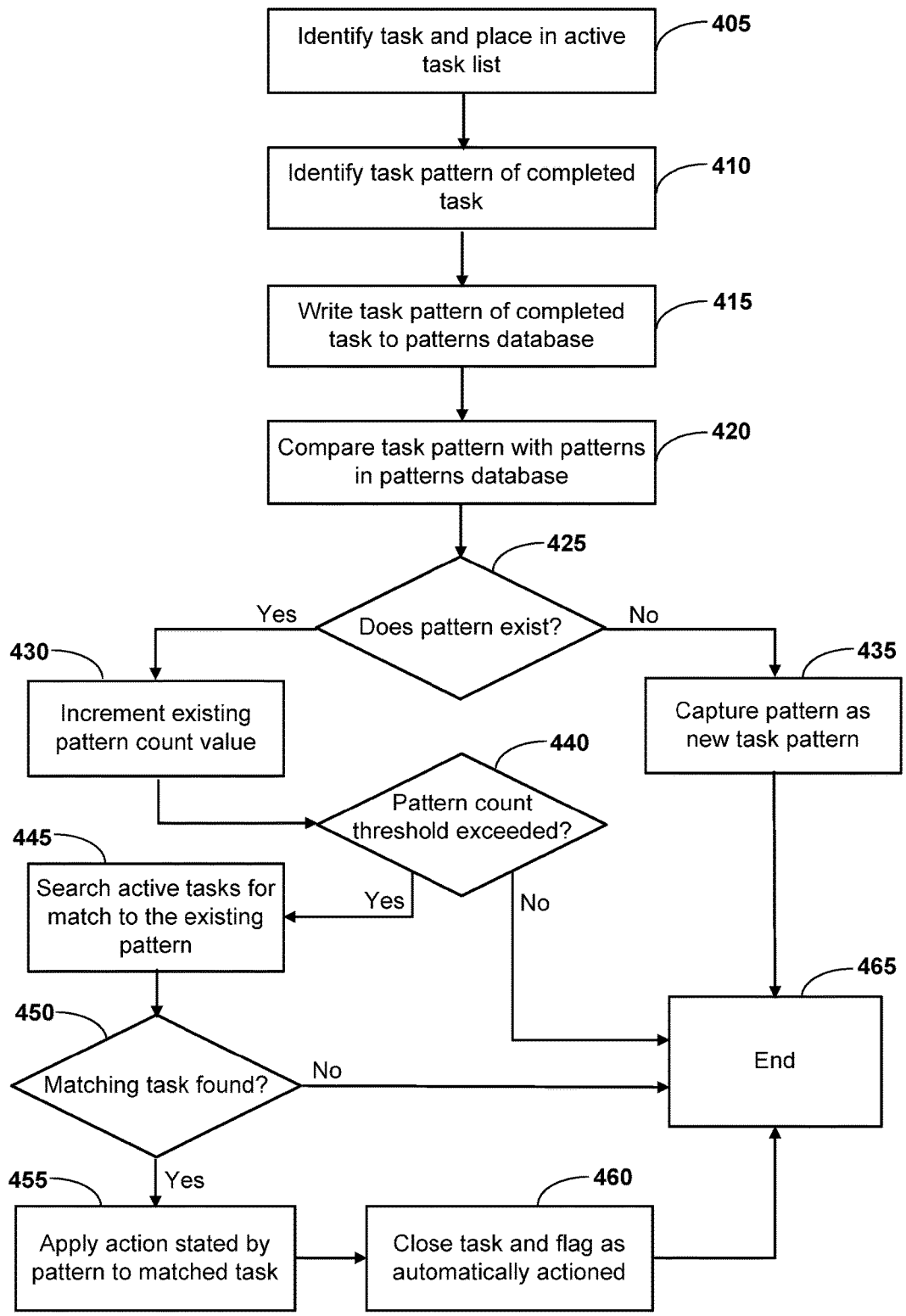
FIG. 4 depicts a flow chart of a method of operating an MDM system, according to embodiments.

The method of FIG. 4 may be executed over various computer processing circuits. The flow diagram of FIG. 4 may commence from step 260 (FIG. 2) as described with reference to the operation of MDM system 130 (FIG. 1), which is the point where a task may be passed by task handling functionality of MDM system 330 to a task handling station 370 of a data steward for action. In embodiments, MDM system 330 may identify a task for a data steward action at step 405 and place the task in an active task list comprising an active task queue, for example, queue 360 of FIG. 3A. A data steward at task handling station 370 may remove the task from the active task list that may comprise queue 360, and completes the task. In an embodiment (e.g., that of FIG. 3B) completion can be assisted or completed by AI system 390.

At step 410 pattern identification logic of MDM system 330 (FIG. 3A) identifies the task pattern of the completed task. In addition to the action taken by the data steward to complete the task, the task pattern identified may include such items as an identifier of the data items in the task, and the relevant fields matched. At step 415 pattern processing logic of MDM system 330 can write the identified task pattern in a defined task pattern format to patterns database 375 (FIG. 3A). Pattern processing logic of MDM system 330 may group the task patterns in an appropriate logical order within patterns database 375.

Pattern identification logic of MDM system 330 may repeat the task pattern identification operation for each task completed at task handling station 370. Processing may move to step 420 at which processing logic of MDM system 330 compares the identified task pattern with patterns in patterns database 375 in a matching operation. At step 425 MDM system 330 processing logic determines if there is a match using appropriate matching criteria. If it determines there is no match, and that the pattern is not pre-existing in task patterns database 375, processing follows the "no" branch. At step 435 pattern processing logic of MDM system 330 captures the task pattern as a new task pattern and records it in patterns database 375 in the defined pattern format. Processing can then pass to step 465, where it ends.

If at step 425 the pattern does exist in patterns database 375, then processing follows the "yes" branch, and pattern processing logic of MDM system 330 increments a pattern count value of the identified pattern by one at step 430. Processing can then move to step 440 at which pattern processing logic determines whether a pattern count threshold is now exceeded for this pattern. The value of the pattern count threshold for the pattern may be set at a value determined to indicate the likelihood of a large amount of data processing time at task handling station 370 of a data steward. If the pattern count threshold is not exceeded, then processing follows the "no" branch to step 465 where processing ends.

If the pattern count threshold is exceeded for that pattern, processing follows the "yes" branch and at step 445, processing logic of MDM system 330 searches all active tasks in active task list 360 at task handling station 370. Processing can then move to step 450 where processing logic of MDM system 330 determines if any task matching the pattern whose threshold is exceeded is present in queue 360. If no matching task is found, then processing follows the "no" branch and processing can end at step 465.

If processing logic of MDM system 330 finds a matching task in the active tasks in active task list 360, processing follows the "yes" branch to step 455. At step 455, processing logic of MDM system 330 applies the action recorded for that task pattern in task pattern database 375 to that queued matching task. Processing can pass to step 460 and processing logic can close the task. The task can then also be flagged in the queue as automatically actioned. The process can end at step 465.

Processing logic of MDM system 330 repeats this process for each further task present in active task list 360 which matches this task pattern. This task pattern can then have a status of "threshold value exceeded" and processing logic of MDM system 330 can then automatically process any further tasks entering active task list comprising queue 360 which match this pattern so that they are not presented at task handling station 370 to a data steward for action. In another embodiment, processing logic of MDM system 330 can prevent matched tasks from entering the active task list that comprises queue 360. In an embodiment, processing logic may continue to increment pattern counts of task patterns after the task patter has reached its threshold value.

The MDM system 330 of the above described embodiment comprises a rules database 340 which MDM system 330 uses to identify tasks which may be processed automatically because they match a rule or rules of rules database 340. MDM system 330 of the above described embodiment further comprises a patterns database 375. MDM system 330 can use this patterns database 375 in identifying tasks partially matched to rules and those tasks which have task patterns matching patterns of patterns database 375 with a pattern count exceeding a threshold value. These tasks are also processed automatically by MDM system 330. The result may be a lowering of the number of tasks which require further processing. The lower number of tasks can also result in a decrease in processing demand at a task handling station 370.

As operation of MDM system 330 continues, new task patterns can continue to enter the patterns database 375. MDM system 330 can also continue to identify task patterns in patterns database 375 which exceed their pattern count threshold values and are flagged as "threshold value exceeded" status in patterns database 375. In this way, patterns database 375 may grow in size over time, and numbers of task patterns automatically actioned can also increase over time. In some embodiments, a data governance council may use contents of task patterns database 375 to provide information when considering changes to policies and rules of rules database 340.

Figure 5A:
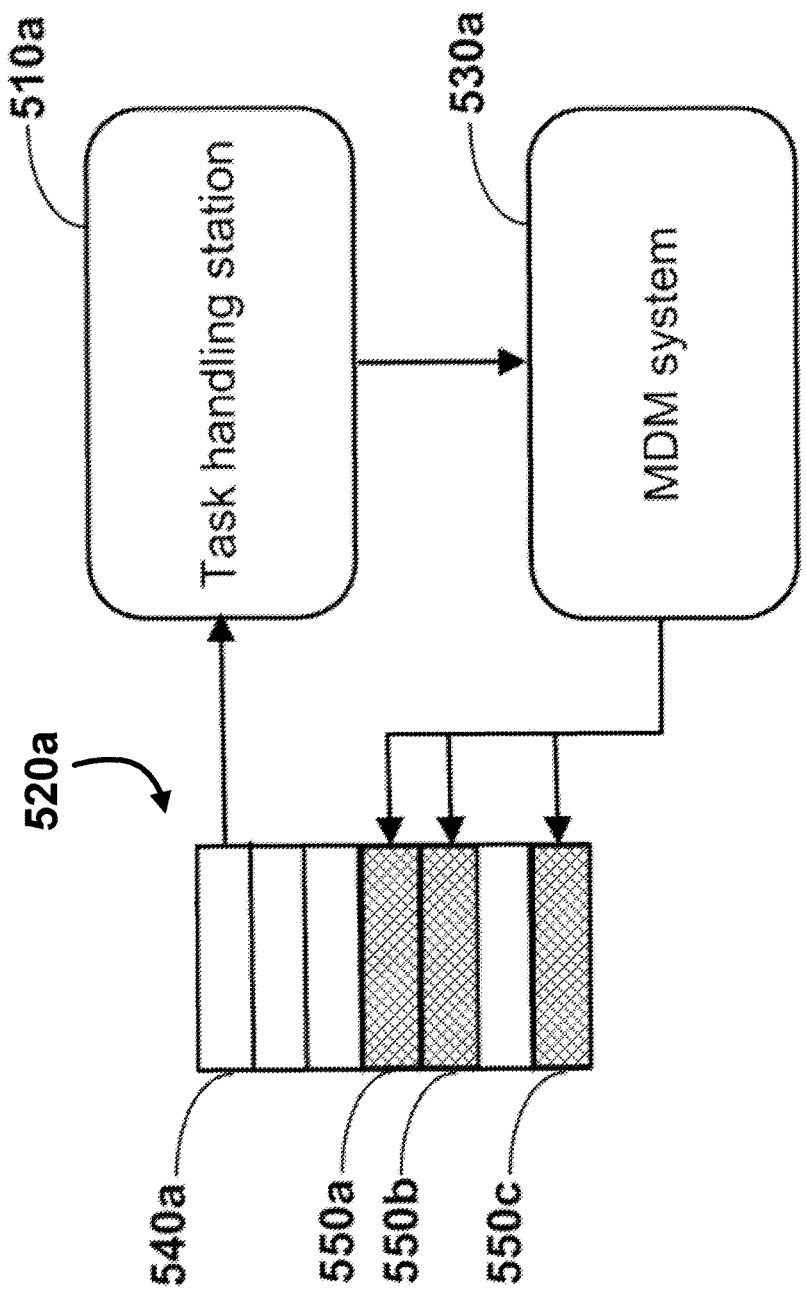
FIG. 5A depicts a block diagram of an operation for task handling, according to embodiments.

FIG. 5A illustrates the operation of a system which can apply to embodiments, for example, those described in FIGS. 3 and 4. An active task list may comprise queue 520a which contains tasks queued for action at task handling station 510a of a data steward. MDM system 530a may comprise a system as in FIG. 3A, MDM system 330. MDM system 530a can remove task 540a, the task at the top of the processing queue, and MDM system 530a can pass the task 540a to task handling station 510a which can then present it to a data steward. The action determined by the data steward can then be applied to task 540a by MDM system 530a. The task and action can be recorded as a task pattern by pattern identification logic of MDM system 530a.

In embodiments, pattern processing logic of MDM system 530a can identify the pattern as a pre-existing pattern of patterns database of MDM system 530a, and increment the pattern count for the pattern by one. This may cause the pattern count threshold to be exceeded for this pattern. This in turn may cause MDM system 530a to search queue 520a for further queued tasks matching the pattern. Tasks 550a, 550b, and 550c may be identified by MDM system as matching the pattern. The action recorded for the matching task pattern can then be applied to each of tasks 550a, 550b, and 550c. MDM system 530a can flag these tasks as automatically actioned and remove them from the active tasks of queue 520a.

Figure 5B:
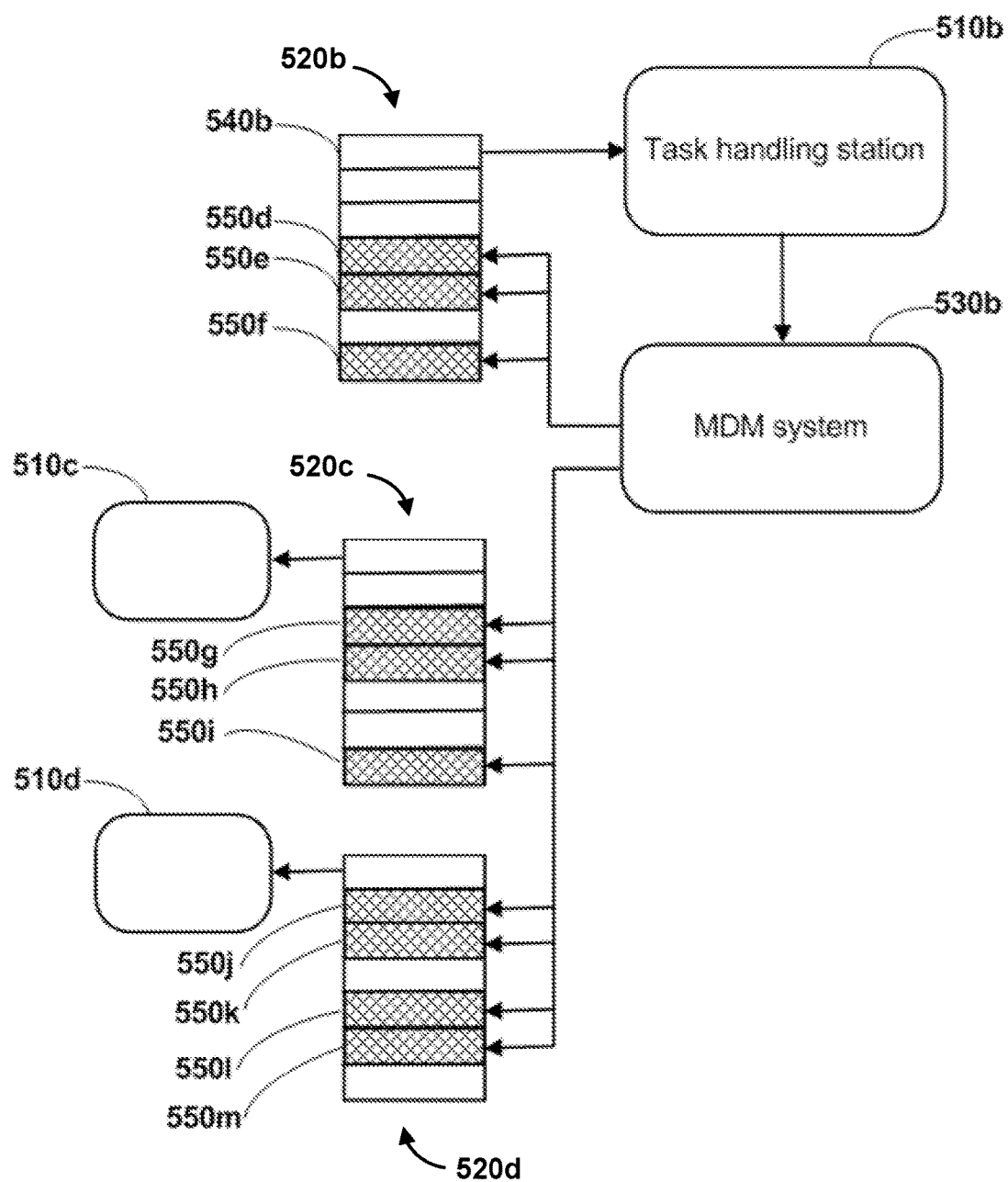
FIG. 5B depicts a block diagram of another operator for task handling with an MDM system, according to embodiments.

FIG. 5B illustrates the operation of a system which applies an embodiment of the invention as described with reference to FIGS. 3 and 4 and as an alternative to FIG. 5A. An alternative embodiment of FIG. 5B differs from the embodiment of FIG. 5A in having more than one task handling station, and a task list comprising more than one queue. The system is illustrated as having three task handling stations each with a queue. Other arrangements are possible comprising two or more task handling stations without departing from the scope of the disclosure.

Task handling stations 510b, 510c and 510d each has a task queue, respectively queues 520b, 520c, and 520d. MDM system 530b comprises means for selecting tasks for adding to queues 520b, 520c, and 520d. This may comprise for example load balancing processing of MDM system 530b which optimally distributes tasks to queues 520b, 520c, and 520d. In the example operation of the embodiment of FIG. 5B, task 520b is processed at task handling station 510b. MDM system 530b identifies the task pattern of task 540b, which matches a task pattern of patterns database of MDM system 530b. MDM system 530b increments the pattern count value by one and thereby exceeds the threshold count value for this task pattern.

MDM system 530b now searches the active task list across queues 520b, 520c, and 520d. The search matches a number of pending tasks in each of queues 520b, 520c, and 520d. These are 550d, 550e, and 550f from queue 520b, 550g, 550h, and 550i from queue 520c and 550j, 550k, 5501, and 550m from queue 520d. MDM system 530b can process each of these tasks as determined by the matched task pattern which has exceeded its threshold count value. It can flag each identified task as automatically actioned, and remove each from the active task queues.

Variations of the arrangements of the embodiments described above are possible without departing from the scope of the disclosed. For example, task handling station of FIG. 5a may represent multiple task handling stations, each task handling station having a data steward but each taking tasks from the same queue 520a. In this arrangement, the task at the head of the queue is addressed by the first available task handling station, or distributed from queue 520a using any suitable distribution scheme.

Figure 6A:
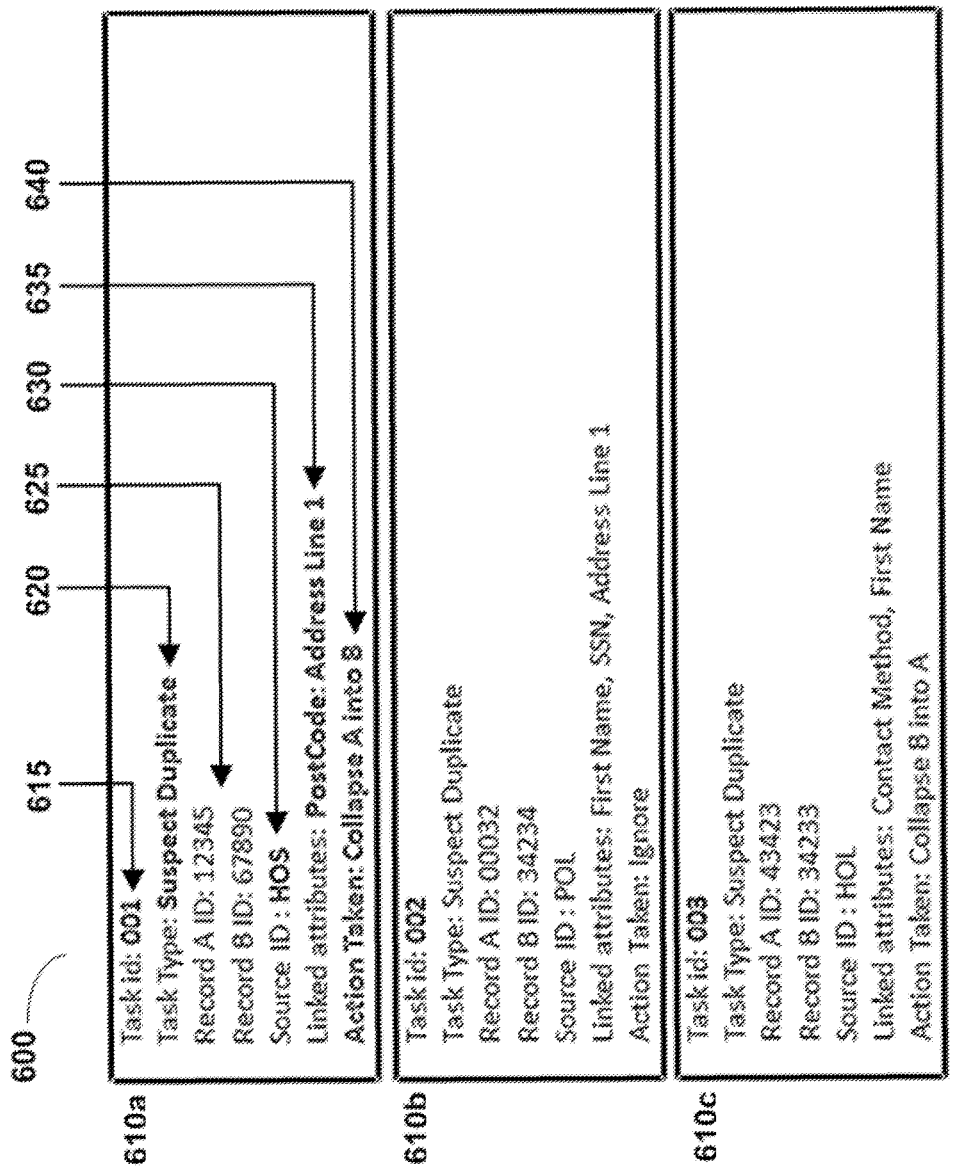
FIG. 6A depicts a first portion of an example of an active task list comprising a task queue, provided by, for example, an MDM system as described with reference to FIG. 3A, for a task handling station, according to embodiments.
Figure 6B:
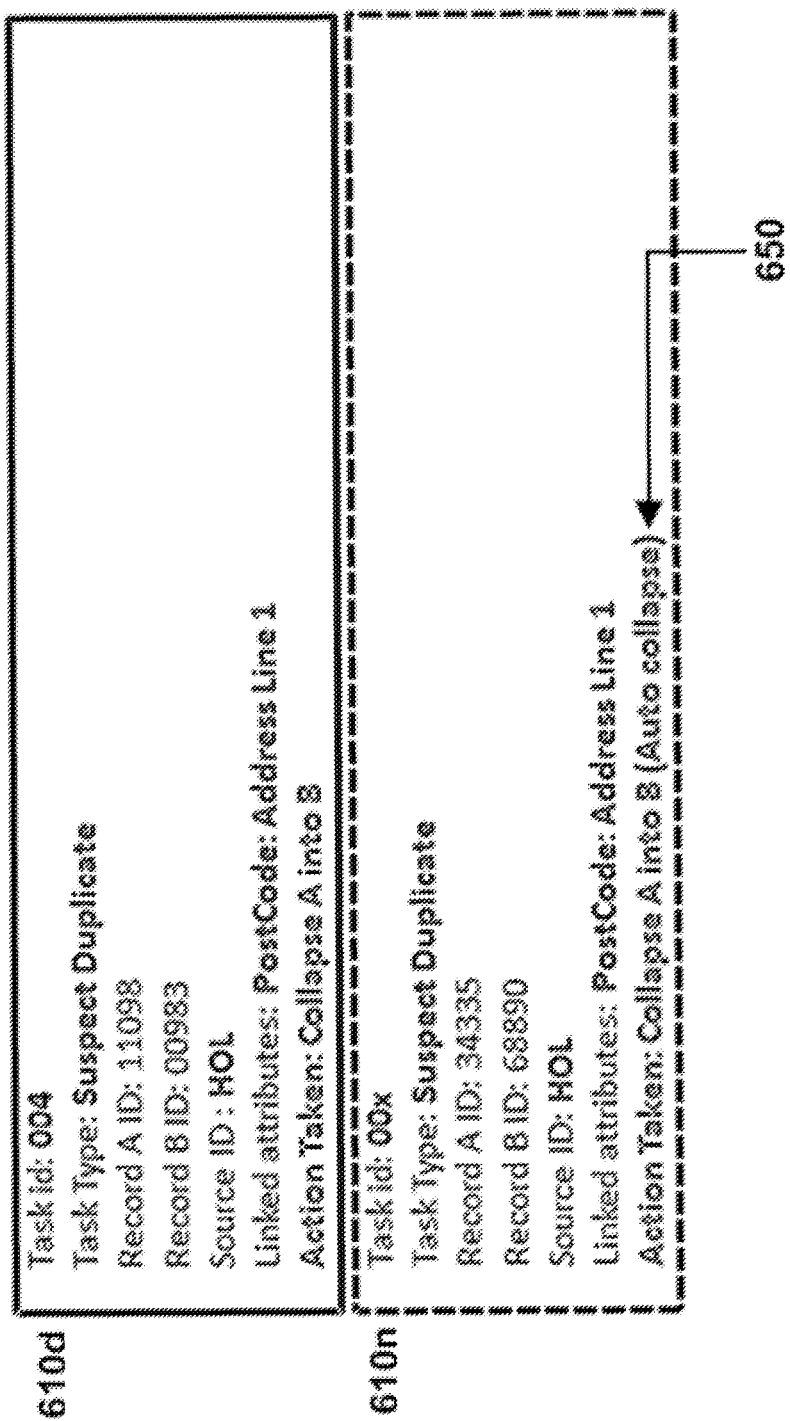
FIG. 6B depicts a second portion of an example of an active task list comprising a task queue, provided by, for example, an MDM system as described with reference to FIG. 3A, for a task handling station, according to embodiments.

FIG. 6A depicts a first portion of an example of an active task list comprising a task queue 600, provided by, for example, an MDM system as described with reference to FIG. 3A, for a task handling station, according to embodiments. FIG. 6B depicts a second portion of an example of an active task list comprising a task queue for a task handling station, according to embodiments.

Task queue 600 may comprise tasks 610a to 610n. Each task may comprise a data record structure. Using task 610a as an example, each task may comprise the following: Task id 615 may comprise a unique identifier applied by MDM system 330 to the task in the queue. Task type 620 may comprises a task type identifier according to task classification processing logic of MDM system 330 (FIG. 3A). Data covered by the task 625 may comprise, for example, the data records identified as possibly associated by a rule of rules database 340. Source ID 630 may comprise the source system generating the data, for example, source 1, 2, or 3, 310a, 310b, or 310c (FIG. 3A). Linked attributes 635 may comprise the elements identified in records A and B which may be matched by MDM system 330 processing logic. Action taken 640 may comprise the action taken by MDM system 330 to process task 610a and action taken 640 may be entered by a data steward.

Processing of active task list comprising queue 600 may proceed in task order 610a, 610b, 610c, and to 610d. Task 610d may be the same as task 610a, in that it has the same task pattern as task 610a. In the example shown, processing of task 610d increments the count of the task pattern of task 610a and 610d so as to exceed the pattern count threshold value of patterns database 375 for that pattern. In response, MDM system 330 can then search some or all active tasks in active task list comprising queue 600, and identify task 610n as matching the task pattern. MDM system 330 may action task 610n according to the action of the task pattern, and record that the action may occur automatically (auto collapse in this case) in action taken 650. The system can then flag task 610n as automatically actioned and remove task 610n from the active task list comprising queue 600.

Figure 7A:
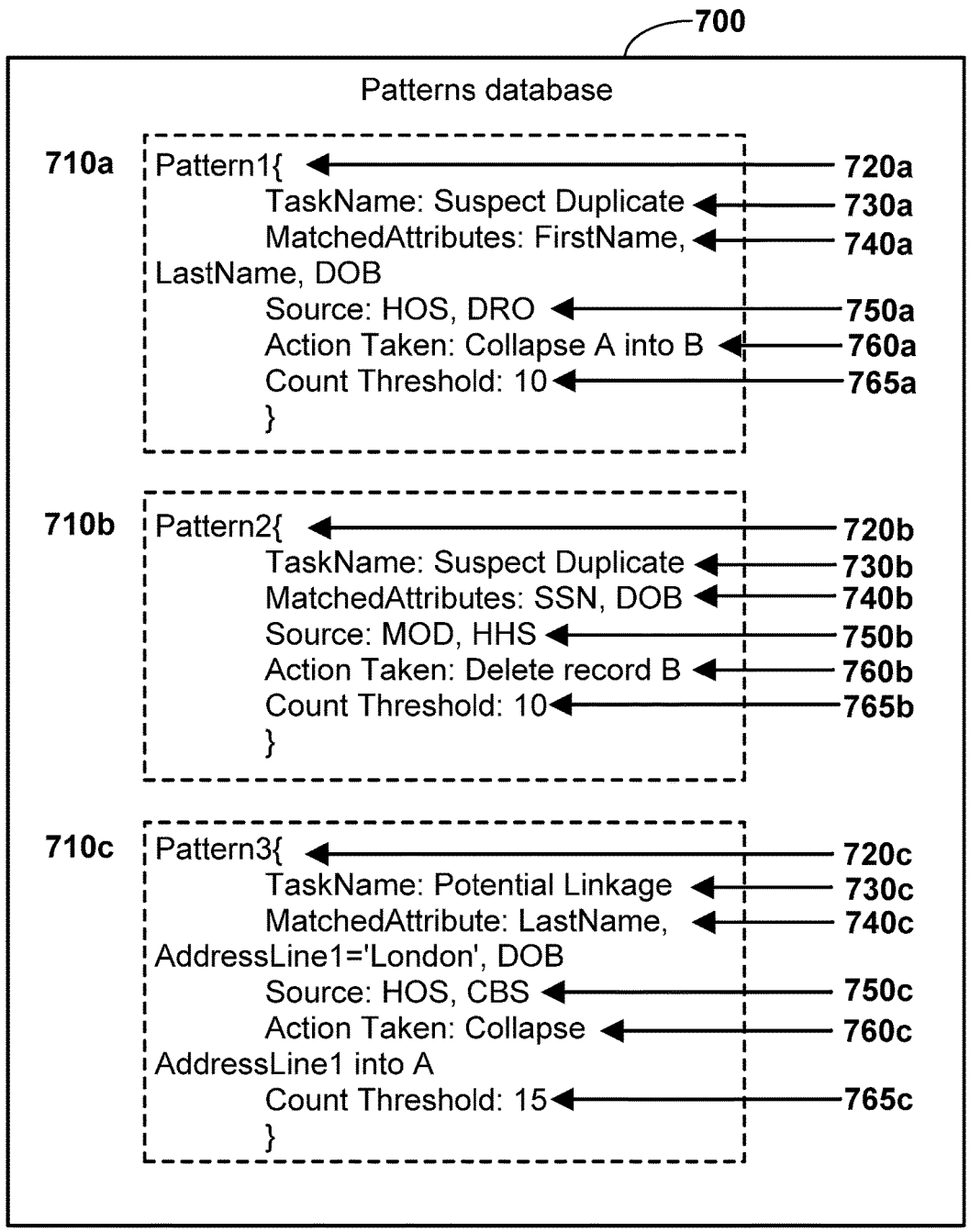
FIG. 7A depicts a patterns database comprising patterns, according to embodiments.

FIG. 7A depicts a patterns database 700, according to embodiments. Patterns database 700 may be, for example, patterns database 375 of FIG. 3A. Task patterns are depicted in the figure as they might appear in patterns database 700. Three task patterns, 710a, 710b, and 710c show example task patterns. Each task pattern may comprise metadata identifying the content of the task pattern and an action which was taken to handle the task originating the task pattern. Each task pattern may also comprise data from constituent records of the originating task. A combination of data and metadata may be envisioned without departing from the scope of the disclosed, for example exclusively metadata, exclusively data, or some mixture of the two.

In the examples depicted, task patterns 710a, 710b, and 710c may comprise task pattern names, respectively Pattern1 720a, Pattern2 720b, and Pattern3 720c. Further fields of the task patterns comprise for example the type of task, here identified as TaskName, 730a, 730b, and 730c respectively. This field comprises metadata describing the task type, for example Suspect Duplicate in 710a. Field 740a, 740b, and 740c comprise the attributes matched in the task, here identified as MatchedAttribute. This field may comprise data in addition to metadata, as shown in task pattern 710c, field 740c which contains data in the form of AddressLine1='London'. Field 750a, 750b, and 750c may comprise the source from which the data for the task was taken, here identified as Source.

Field 760a, 760b, and 760c may comprise the action taken for the originating task, identified as Action Taken. Field 765a, 765b, and 765c may comprise the pattern count threshold for task patterns 710a, 710b, and 710c, respectively. In embodiments, pattern count thresholds 760a, 760b, 760c may comprise a default value automatically entered at pattern creation in patterns database 375. In embodiments, pattern count threshold 760a, 760b, and 760c may be set by an operator. This operator could be, for example, a data steward at task handling station 370, using an administrator user interface of task handling functionality of MDM system 330. This may be by selection of an appropriate value to replace the default value. For example, in FIG. 7A the default pattern count threshold 765a, 765b is 10 as in Pattern1 710a and Pattern2 710b. The pattern count threshold 765c of Pattern3 710c has been changed to 15. In embodiments, a global pattern count threshold may be set for all task patterns so that there is no requirement for a pattern count threshold field 765a, 765b, and 765c of task patterns 710a, 710b, and 710c, respectively. In this embodiment, global settings of MDM system 330 may set the task pattern threshold. Global settings may be set by, for example, use of an administrator user interface.

FIG. 7B depicts an example data structure, table 770, recording the pattern count value of patterns, for example, for each of the patterns of FIG. 5A, according to embodiments. Column 775 may comprise the pattern name. Column 780 may comprise the pattern count which is incremented by one at each match of the task pattern. Column 785 may record whether MDM system 330 will automatically action tasks matching the respective task pattern. In this example, threshold pattern count value set in MDM system 330 for Pattern1, 710a is 10. The count for Pattern1 is 17, and so the value in column 785 is "Yes". MDM system 330 therefore may read this value from data structure 770 and automatically action all tasks matching Pattern1, 710a in active task queues, for example, queue 360 of MDM system 330.

Figure 8A:
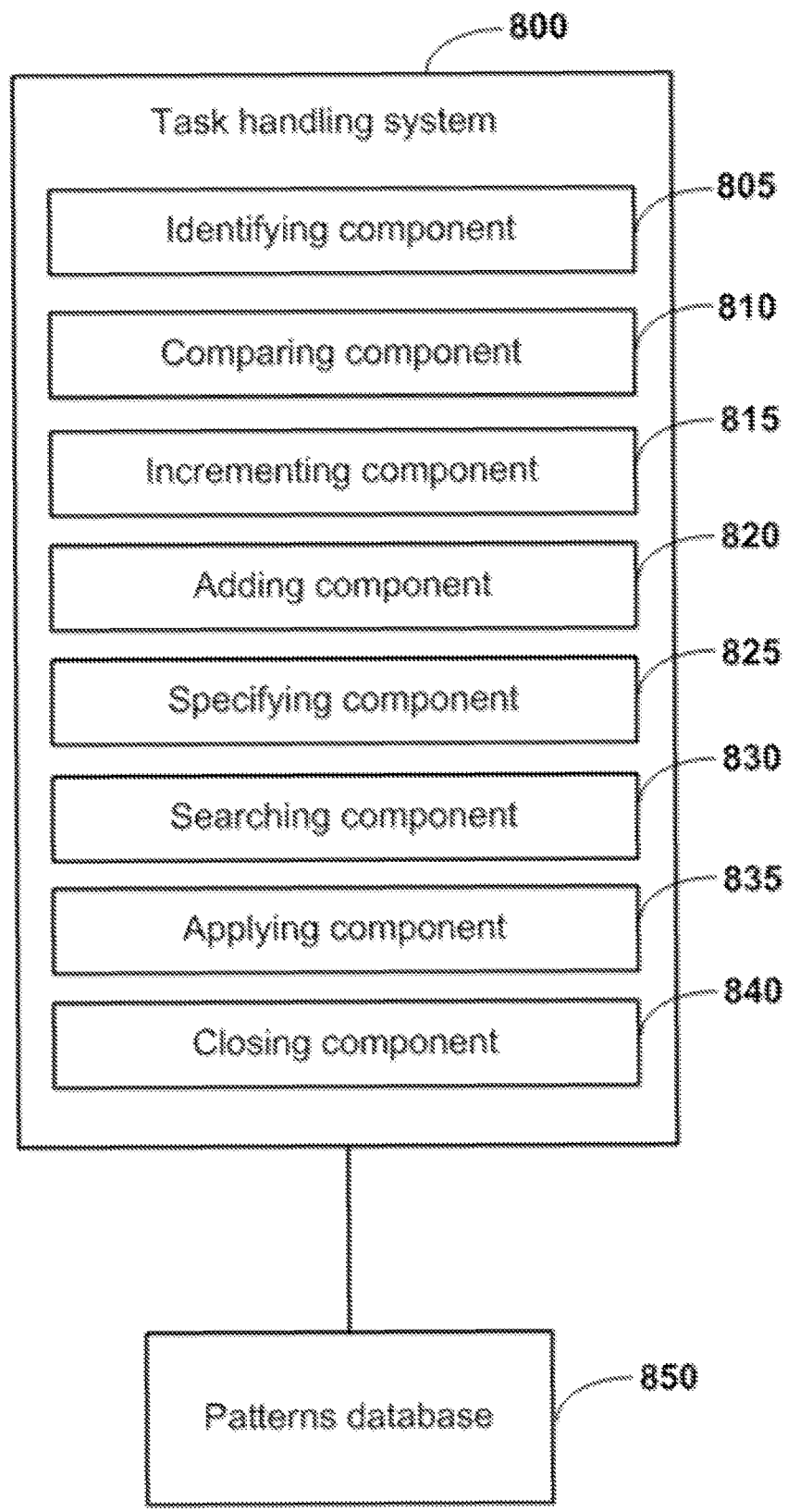
FIG. 8A depicts a task handling system for handling tasks in an MDM system, according to embodiments.

FIG. 8A depicts an embodiment comprising a system comprising a task handling system 800. Task handling system 800 may comprise a part of an MDM system according to embodiments, such as MDM system 330 (FIG. 3A). In task handling system 800, identifying component 805 identifies a task pattern in a task completed at a task handling station, such as task handling station 370. The system may write the identified task pattern to patterns database 850, which may be a patterns database such as patterns database 375 (FIG. 3A).

Comparing component 810 may compare the identified task pattern with existing task patterns of patterns database 850. If the identified task pattern matches an existing task pattern in patterns database 850, incrementing component 815 may increment a task pattern count of the existing task pattern. If the identified task pattern does not match an existing task pattern in patterns database 850, adding component 820 may add the identified task pattern as a new task pattern in patterns database 850.

Specifying component 825 may specify a task pattern count threshold for a task pattern. Specifying component 825 may receive input from a default pattern count threshold of patterns database 850, or from a pattern count threshold entered by a human operator. For example, the human operator may be a data steward at task handling station 370. If the task pattern count threshold is exceeded for a task pattern, searching component 830 may search active tasks in an active task list awaiting attention in task handling system 800 and identify active tasks matching that task pattern.

Applying component 835 may apply, to each matched active task, the action for that task pattern as recorded in patterns database 850. Closing component 840 may close each task as "actioned" and flag each closed task as "automatically actioned."

Figure 8B:
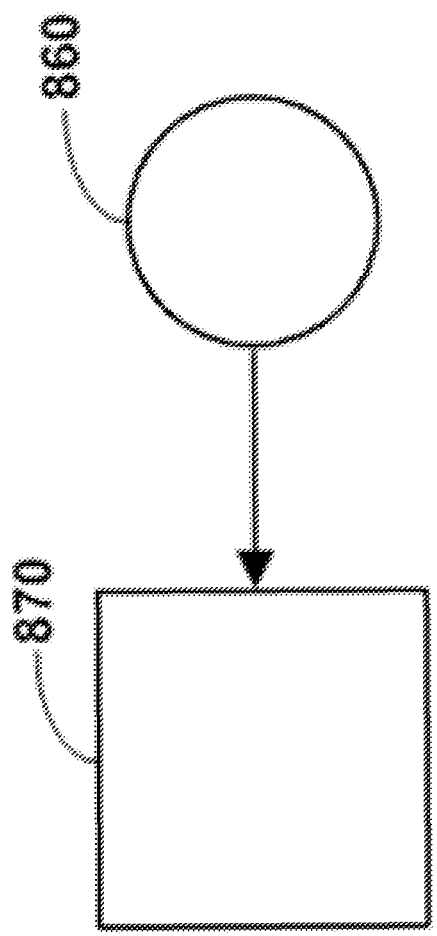
FIG. 8B depicts a computer program product, according to embodiments.

FIG. 8B depicts a computer program product, according to embodiments. The computer program product may comprise a computer readable storage medium 860. Computer readable storage medium 860 may comprise a computer program stored therein which implements embodiments of the invention as described above when loaded in to a data processing device, for example, data processing apparatus 870 illustrated, and executed by data processing apparatus 870.

Figure 9:
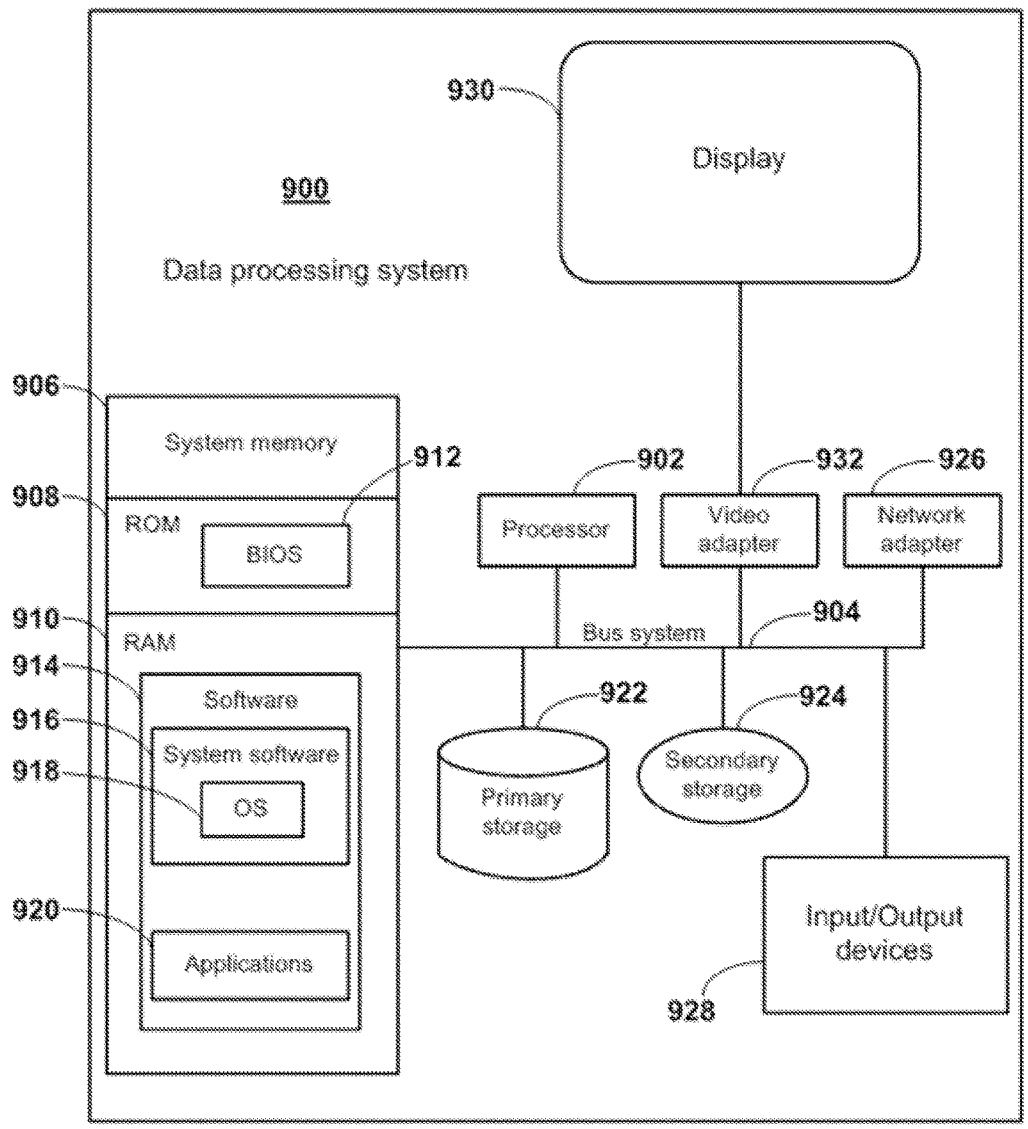
FIG. 9 depicts a data processing system configured to hand tasks and manage data as described, according to embodiments.

FIG. 9 illustrates a system for implementing aspects of the present disclosure, according to embodiments. Data processing system 900 operable for storing and/or executing program code includes at least one processor 902 coupled directly or indirectly to memory elements through a system bus 904. The memory elements may comprise local memory employed during actual execution of the program code, bulk storage memory, and cache memory for providing temporary storage of at least some program code in order to reduce the number of times program code must be retrieved from bulk storage during program execution.

Memory elements may comprise system memory 906 in the form of non-volatile read only memory (ROM) 908 and volatile random access memory (RAM) 910. A basic input/output system (BIOS) 912 may be stored in ROM 908. Software 914 may be stored in RAM 910. Software 914 may comprise system software 916, which may comprise operating system software 918, and software applications 920.

Memory elements may also comprise primary storage means 922 which may comprise a magnetic hard disc drive, and secondary storage means 924 which may comprise an optical disc drive or a magnetic disc drive. The primary and secondary storage means and their associated computer-readable storage media provide non-volatile storage of computer-executable instructions, data structures, program modules and other data for data processing system 900. Software applications may be stored on the primary and secondary storage means 922, 924 as well as in system memory 906.

Data processing system 900 may operate in a networked environment using logical connections to one or more remote data processing systems via network adapter 926.

Input/output (I/O) devices 928 may be coupled to the system either directly or through intervening I/O controllers. A user may enter commands and information into system 900 through input devices such as a keyboard, pointing device such as a mouse, or other input devices such as microphone, joystick, trackball, touchpad, game controller, satellite dish, scanner etc. Output devices may comprise printers, speakers etc. Display device 930 may also be connected to system bus 904 via an interface such as video adapter 932.

The present disclosure may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method comprising:
    applying, to a set of data, a set of rules, wherein the set of rules is stored in a rules database;
    determining, based on the applying the set of rules to the set of data, an absence of matching between the set of data and a rule in the set of rules, wherein the determining the matching is based on a predetermined degree of matching, and wherein partial matching that exceeds the predetermined degree of matching results in a determination of the presence of matching;
    identifying a task pattern in a completed task in a task handling system, the identified task pattern comprising:
        the set of data, the set of data selected from a group consisting of task data and task metadata; and
        an action taken in the task handling system to complete the completed task;
    comparing the identified task pattern with task patterns of a patterns database, wherein the patterns database comprises a plurality of task patterns and actions associated with each task pattern, and wherein the comparing comprises comparing an action associated with each task pattern with a set of actions included in the task patterns of the patterns database;
    determining the identified task pattern matches an existing task pattern in the patterns database, the patterns database comprising a plurality of task patterns and actions associated with each task pattern;
    incrementing, in response to the determining, a task pattern count of the existing task pattern;
    determining, in response to the incrementing the task pattern count, that a task pattern count threshold for the existing task pattern in the patterns database has been exceeded, wherein the task pattern count threshold is a value that has been determined to indicate a likelihood of a requirement of a particular quantity of data processing time;
    searching, in response to the determining that the task pattern count threshold has been exceeded, active tasks in an active task list, the active task list comprising a plurality of tasks queued for processing in the task handling system;
    identifying, in the active task list, a set of one or more active tasks that match the existing task pattern;
    applying, to each matched active task in the set of one or more active tasks, the action for the existing task pattern, as recorded in the patterns database; and
    closing each matched active task.

2. The computer-implemented method of claim 1, wherein the completed task is completed at a task handling station of the task handling system.

3. The computer-implemented method of claim 2, wherein the task handling system is a master data management system.

4. The computer-implemented method of claim 1, wherein the active task list comprises a queue for operator attention at a task handling station.

5. The computer-implemented method of claim 1, wherein the active task list comprises a plurality of queues for operator attention at a plurality of task handling stations.

6. The computer-implemented method of claim 1, wherein the action taken in the task handling system to complete the task is determined by decision logic of an artificial intelligence data processing engine.

7. The computer-implemented method of claim 1, the method further comprising:
    identifying a second task pattern in a second completed task in the task handling system, the identified second task pattern comprising:
        a second set of data, the second set of data selected from a group consisting of task data and task metadata; and
        a second action taken in the task handling system to complete the completed task;
    comparing the identified second task pattern with the task patterns of the patterns database;
    determining an absence of a match between the identified second task pattern and task patterns of the patterns database; and
    adding, to the patterns database, the identified second task pattern.

* * * * *